Oct. 31, 1967 K. D. FOULGER ETAL 3,350,693
MULTIPLE SECTION TRANSFER SYSTEM
Filed June 26, 1964 4 Sheets-Sheet 1

INVENTORS
KENNETH D. FOULGER
JOHN J. HARMON
ARTHUR G. SILVER
BY Ronald J. Clark
ATTORNEY Oct. 31, 1967 K. D. FOULGER ET AL 3,350,693

MULTIPLE SECTION TRANSFER SYSTEM

Filed June 26, 1964

4 Sheets-Sheet 2

United States Patent Office 3,350,693

Patented Oct. 31, 1967

3,350,693
MULTIPLE SECTION TRANSFER SYSTEM

Kenneth D. Foulger and John J. Harmon, San Jose, Calif., and Arthur G. Silver, Endicott, N.Y., assignors to International Business Machines Corporation, New York, N.Y., a corporation of New York

Filed June 26, 1964, Ser. No. 383,540
8 Claims. (Cl. 340—172.5)

ABSTRACT OF THE DISCLOSURE

The present disclosure is directed towards a record handling apparatus wherein each record is several fixed length sections in length. The first characters in the stored record hold numeric section characters identifying the number of sections in the record. Apparatus is described for locating a desired section at which the transfer is to begin, for manipulating the address and section characters required to write a record on a bulk storage unit and for controlling the inter-operation of these and other circuits.

This invention relates to data transfer circuits and more particularly, to an improvement in the data handling circuits operating between a central processing unit and its Random Access File (RAF).

Generally, a data processing system includes a RAF or a permanent filing device for storing the great quantity of reference material required by the processor in performing its function. A typical storage device comprises a plurality of magnetic disks, magnetic drums or closed loop magnetic strips and their accessing mechanisms. The recording surface of a magnetic disk contains a plurality of concentric tracks physically separate from each other. Moreover, each track is normally subdivided into a plurality of fixed length sections and each section is used to store a separate message. Normally, the data capacity of each section determines the maximum message length which the file can hold. Additionally, each section is individually addressable and accessible by magnetic read-write transducers usually employed to enter data onto the disks and to detect data written on the disks. Under existing procedures, when information is to be stored for later use, a single track location is addressed and one of the fixed length sections is selected. Mechanical movements and operations are employed to select the addressed track and electrical comparisons are utilized to locate the desired section. A short message equal to or less than the storage capacity of the selected section can be entered directly onto the disk in one operation. A longer message greater than the storage capacity of a single section must be divided prior to writing it into several sections. Such a pre-editing procedure is time consuming since the long message must be divided into suitable length portions, each of which is assigned a separate address.

Accordingly, it is an object of the instant invention to provide a data transfer circuit which automatically subdivides a lengthy message into fixed length sections and transfers successive sections to a random access file.

It is a further object of the instatnt invention to provide a data transfer circuit employing the circuitry of a processing unit to achieve subdivision of a lengthy message.

According to these objects, the instant invention contemplates the utilization of the addressing circuitry of its associated computer to retrieve an operation code from core memory, which code initiates the multiple section transfer operation. Additionally, the invention utilizes the core memory of the computer to hold the Disk Control Field (DCF) of the message to be transferred. The various Storage Address Registers (STAR) hold the address locations of the DCF characters. These registers direct the sequential interrogation of each DCF character address in core memory and the transfer of each DCF message character to the file for storage. A plurality of latches are provided in combination with a control counter to keep track of each individual character to monitor the interrogation of each character from core memory. Compare circuitry is responsive to a section address retrieved from a random access file and the message address in the DCF to identify the selection of the correct file section. A recycle latch is employed to reverse the computer interrogation procedure back to the starting character of the address in core memory whereby reinterrogation of the message address can be accomplished when the first address compare operation indicates the lack of a comparison. An add latch is employed to reverse the sequential computer interrogation procedure across the address area and section area of the DCF in core memory. In a compare operation the interrogation procedure advances across a message address in the DCF, and in a recycle operation the interrogation circuitry reverses its movement across the DCF to the first section address character position without changing the contents of the address area of the DCF. However, during a reverse interrogation of the DCF under the control of the add latch, the contents of the address area and the section area of the DCF are increased and decreased respectively in order to perform the next scheduled part of a multiple section transfer operation.

The foregoing and other objects, features and advantages of the invention will be apparent from the following more particular description of a preferred embodiment of the invention, as illustrated in the accompanying drawings wherein.

Figure 4:
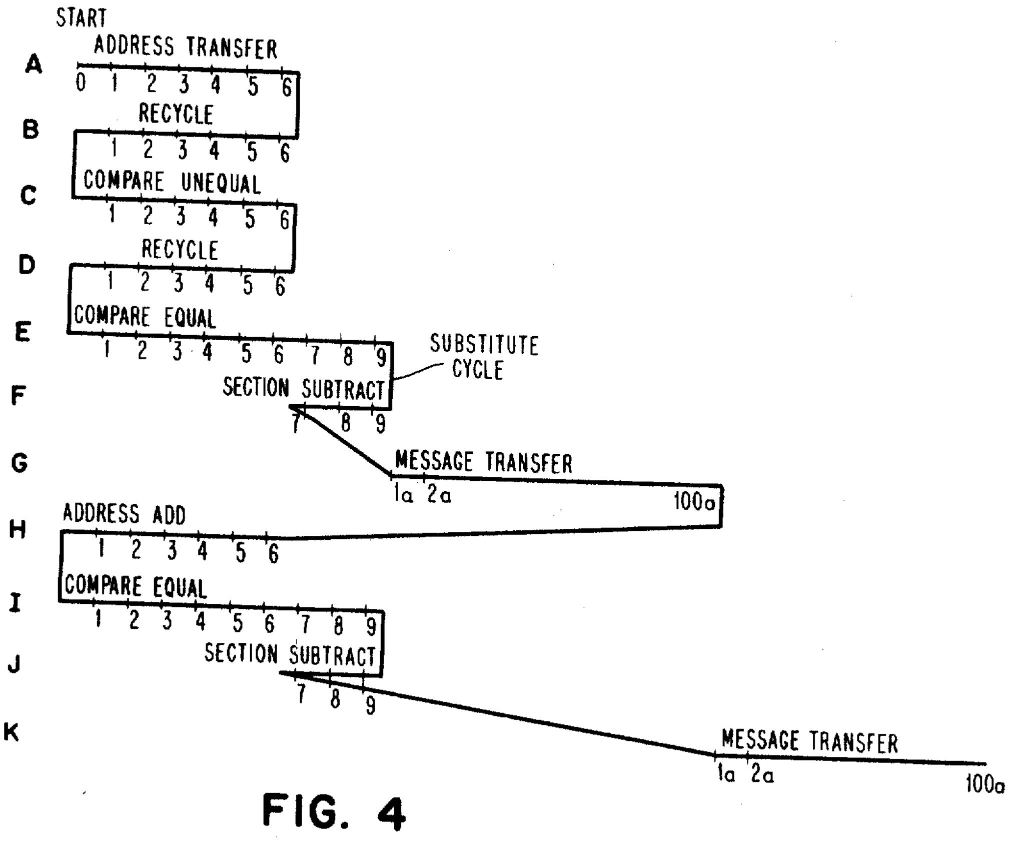
Figure 3A:
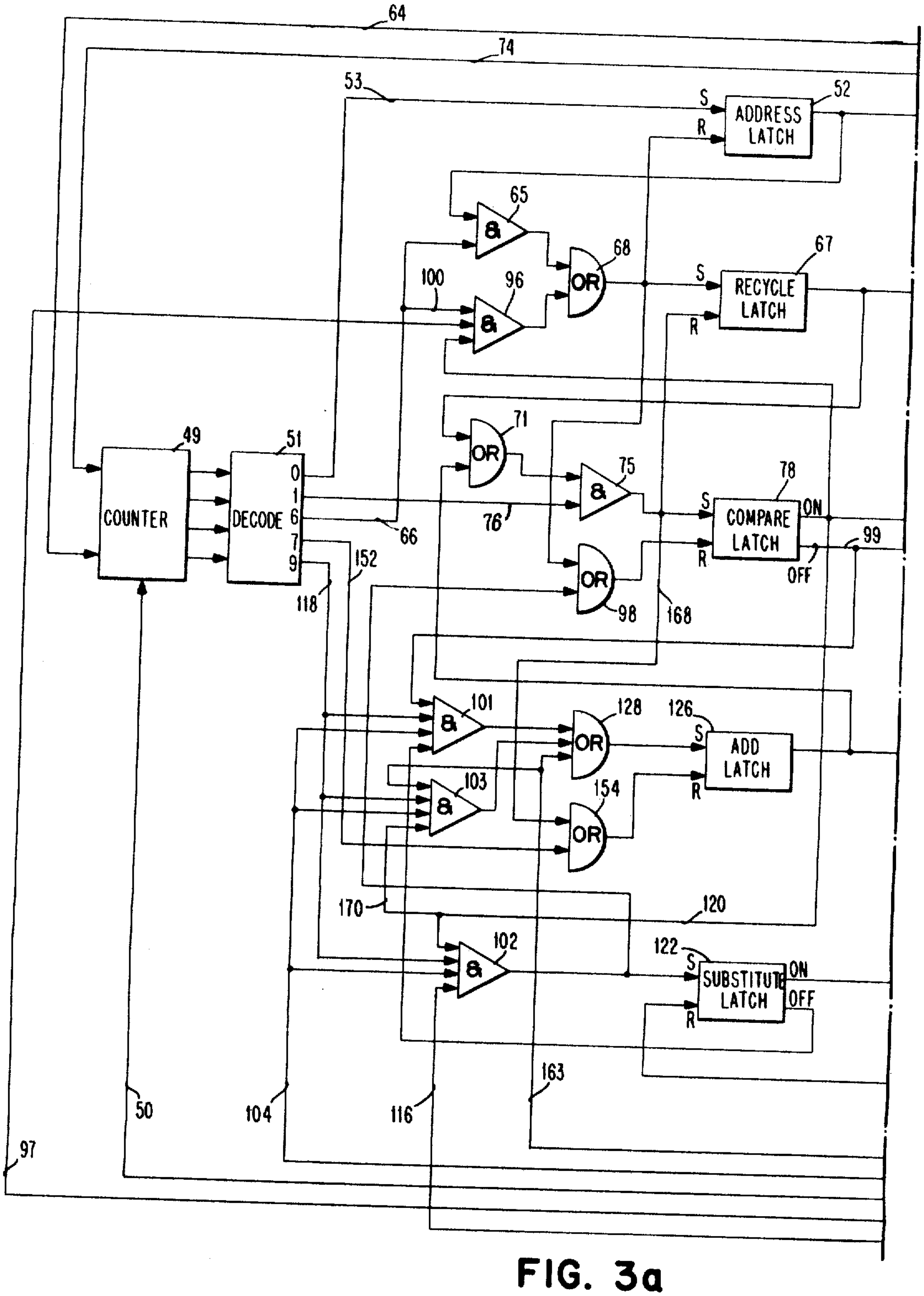
Figure 3B:
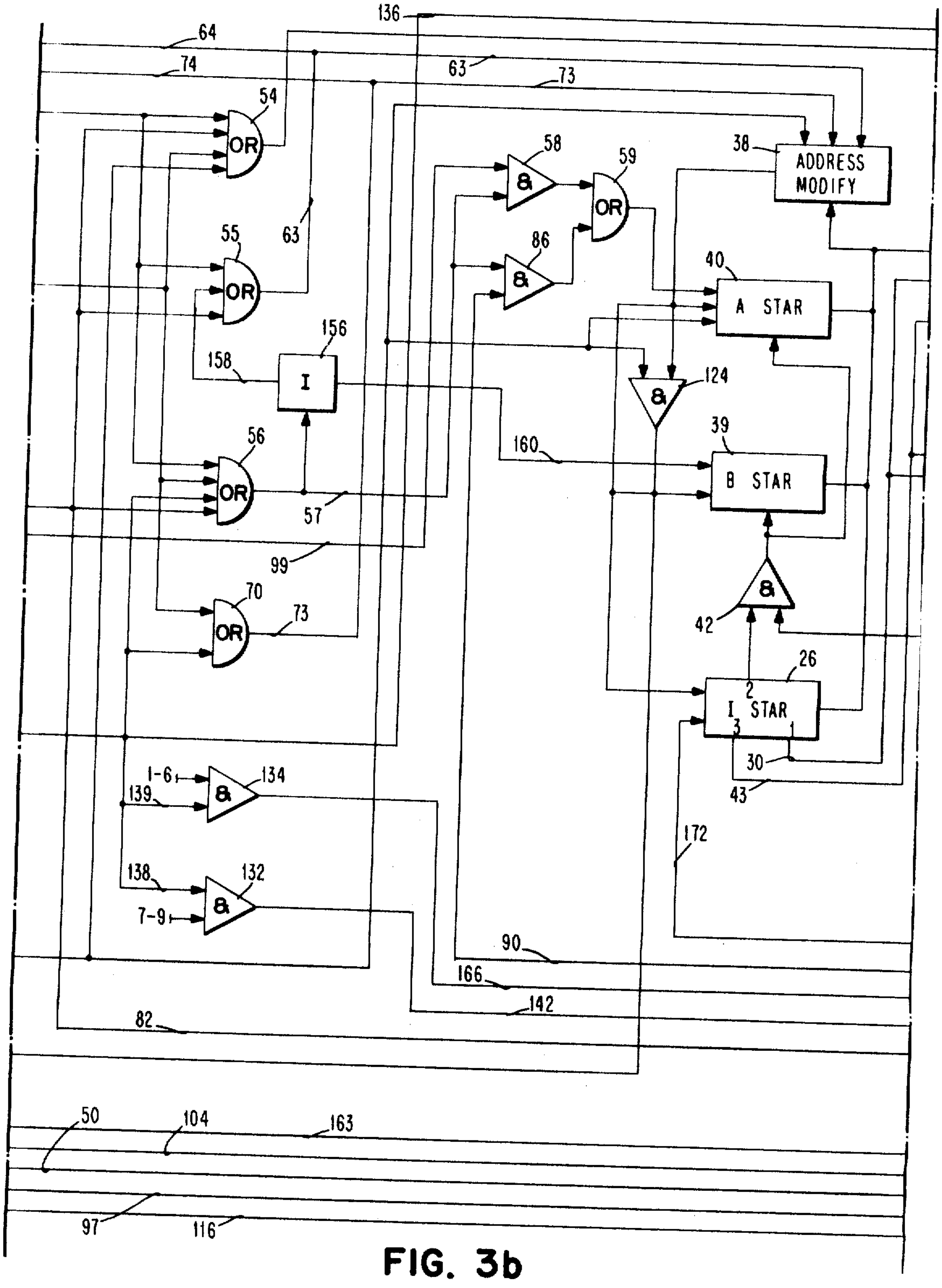
Figure 3C:
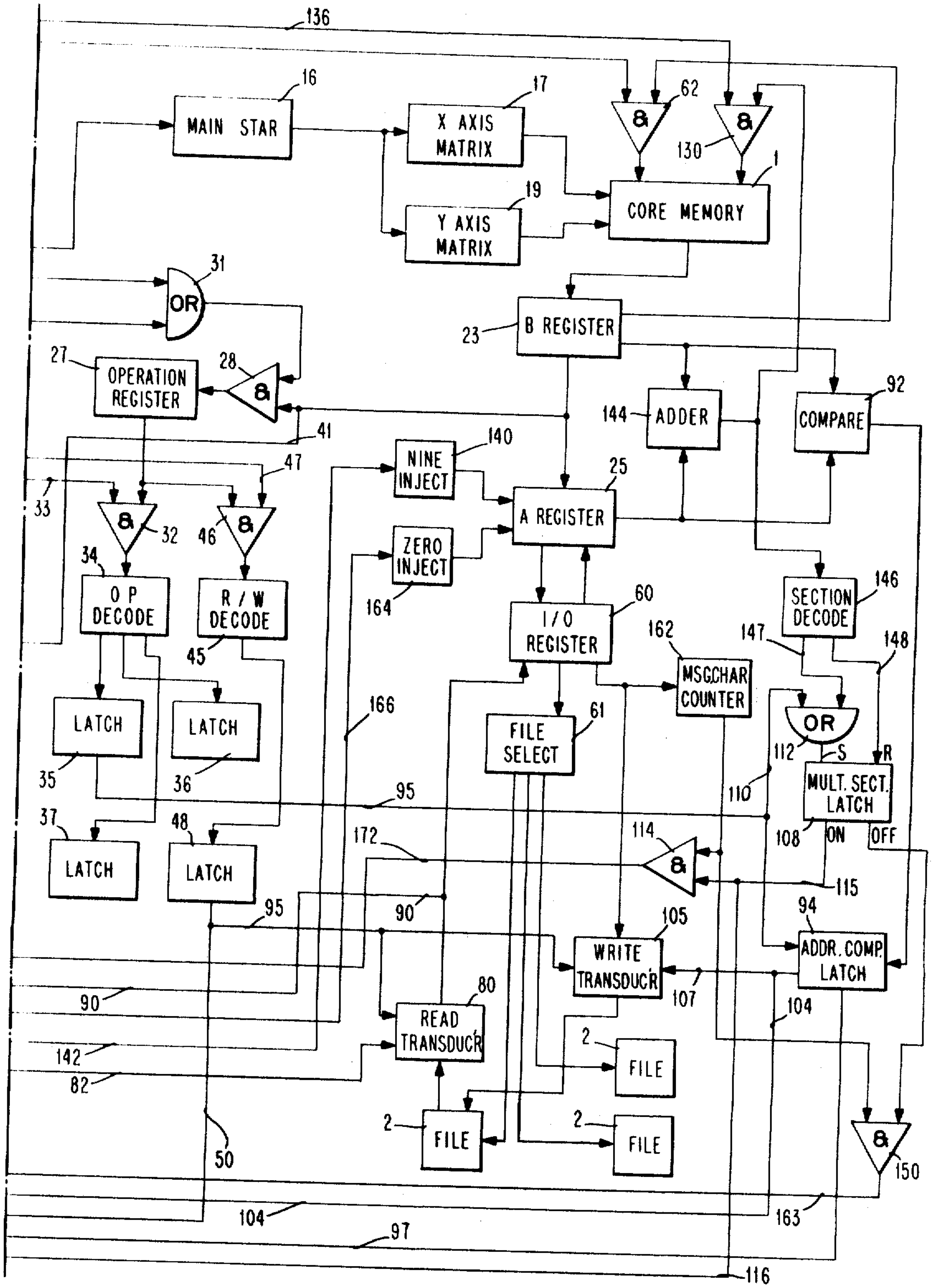

FIGS. 3*a*, 3*b* and 3*c* comprise a block diagram of the circuitry employed to accomplish a multiple section transfer operation; and FIG. 4 is a schematic diagram showing the multiple interrogation process of the Disk Control Field.

FIG. 3*c* shows a computer core memory 1 and a plurality of RAF modules 2 employed in the instant invention. The interrogation of the memory 1 is completely described by F. O. Underwood in his U.S. Patent 3,077,580, entitled "Data Processing System." For a better understanding of this memory interrogation circuitry as employed in the instant invention, the operation of these circuits are again shown and described. However, the detailed operation of these circuits is not repeated. Additionally, standard circuits are identified by name and are not described in detail since they are well known to those skilled in the art.

Figure 1:
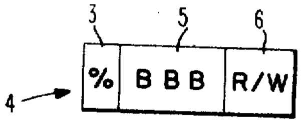
FIG. 1 is a schematic representation of an operation code employed by the associated computer in a file operation.

Referring to FIG. 1, a first portion 3 of an operation code 4 is reserved for an indicium, which indicates that the computer core memory 1 is to be engaged in a transfer operation with one of the files 2. A second portion 5 of this operation code contains additional indicia designating the address location in the core memory 1 of the first character in the Disk Control Field (DCF), described hereinafter, of the message to be transferred. A third portion 6 of the operation code contains indicia indicating that a read or write operation is to be performed.

Figure 2:
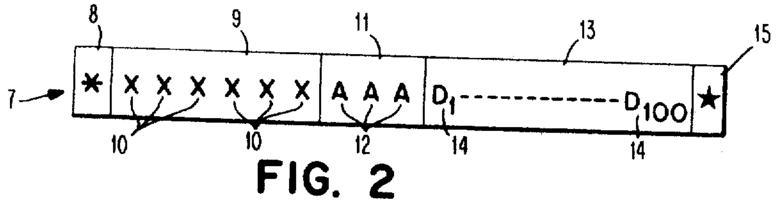
FIG. 2 is a schematic representation of the Disk Control Field employed in the instant invention.

FIG. 2 shows a typical DCF format 7 held in the core memory 1. A first area 8 of the DCF format comprises a character indicating a normal module selection process or an alternate method of selecting a substituted module. If the alternate method of module selection is indicated, the character in the area 8 determines which module is selected. A second area 9 of the DCF format holds a plurality of address characters 10 which designate the section address of an RAF section into which or from which the message is to be transferred. A third area 11 of the DCF format normally holds a plurality of section characters 12 which indicate the length of the message to be transferred according to the number of sections involved in the data transfer. A final area 13 of the DCF format 7 contains a plurality of message characters 14 including a message ending indicium 15. In the cases when data is read from the file 2 to core memory 1, the final area 13 of the DCF format 7 is left blank so that data characters from the file can be stored during the data transfer operation.

FIGS. 1 and 2 show schematic representations of the indicia and characters employed in the operation code 4 and DCF format 7 respectively. Obviously, these indicia and characters are actually stored in magnetic cores as a pattern of coded magnetic signals.

Referring again to FIG. 3*c*, the core memory 1 contains all the information for controlling the internal operation of the processor and the data transfer operation between the processor and one of the files 2. Each character in the DCF format 7 is set up in a separate storage location in core memory 1 by standard programming techniques which need not be described. In the present description, successive storage locations are employed to hold the characters in a DCF format 7 and to simplify the understanding of the memory interrogation operation. Each storage location in core memory 1 is interrogated by a main Storage Address Register (STAR) 16 and an address select matrix circuit comprising an X axis matrix 17 and a Y axis matrix 19. Upon the interrogation of a particular core memory storage location, the character stored therein is read out into a B register 23 and/or an A register 25.

The core memory address of the first indicium of the operation code 4, shown in FIG. 1, is set into an I STAR 26, FIG. 3*b*, by standard computer advancement techniques. That is, as soon as one computer operation is completed, the computer advances to the next programmed operation. The indicia in the first portion 3 of the operation code 4 is interrogated under control of the I STAR 26 and the main STAR 16 and is transferred to an operation register 27 by the B register 23 and an AND gate 28. The I STAR 26 also generates a plurality of enabling output signals which correspond to the various portions of the operation code 4. The first enabling output signal from the I STAR 26 is applied to the AND gate 28 by a line 30 and an OR gate 31 and it is also applied to an AND gate 32 by the line 30 and a line 33. The operation register 27 is connected to an operation decode circuit 34 by the AND gate 32. The indicia in portion 3 of the operation code 4 indicates the type of operation performed between the file 2 and the core memory 1. The operation decode circuit 34 comprises a plurality of matrices for decoding the indicia in portion 3 and it applies an output signal corresponding to each different indicia to a plurality of latches 35, 36 and 37, the functioning of each is described hereinafter.

An address modify circuit 38 receives an input signal from the I STAR 26, a B STAR 39, and an A STAR 40 after their interrogation of each storage location. Prior to the interrogation of the next storage location, the modify circuit 38 applies its output to the I STAR 26 advancing the address held in I STAR 26 to the next adjacent memory storage location. The B STAR 39 and the A STAR 40 receive advancing signals from the address modify circuit 38 when either of these registers is directing the interrogation of the core memory 1.

During the continued interrogation of the core memory 1 by the I STAR 26, the second portion 5 of the operation code 4 is transferred to the A STAR 40 and the B STAR 39 by the B register 23, a line 41 and an AND gate 42.

The AND gate 42 has a second enabling input signal, which signal is the second enabling output signal from the I STAR 26. The A STAR 40 and the B STAR 39 now contain the address location in core storage of the first character of the DCF format 7. The I STAR 26 continues its interrogation of the core memory 1 and transfers the third portion 6 of the operation code 4 to the operation register 27 by the AND gate 28. The AND gate 28 receives an enabling input signal from the I STAR 26 by a line 43 and the OR gate 31. The output from the register 27 is applied to a read/write decode circuit 45 by an AND gate 46. The AND gate 46 has a second input signal from the I STAR 26, which signal is applied to the AND gate 46 by the line 43 and a line 47. The output of the decode circuit 45 is stored in a latch 48 for later use in transferring the message from one of the selected files 2 to core memory 1. Additionally, the setting of the latch 48 is employed to indicate the completion of the operation code interrogation operation. The output of the latch 48 is applied to a control counter 49 by a line 50, setting the counter to its binary zero position.

The counter 49 is a standard counter circuit and may comprise four stages giving the counter a maximum binary count of sixteen positions which are normally labeled position zero through position fifteen. The output signals from each stage in the counter are applied to a decode circuit 51 which generates a single enabling signal corresponding to each position of the counter. The counter 49 advances simultaneously with the interrogation operation to be described hereinafter. The zero position of the control counter 49 is decoded in the decode circuit 51 and applied to an address latch 52 by a line 53. The output of the address latch 52 is applied to a plurality of OR gates 54, 55 and 56.

The output signal of the OR gate 56 is applied to the A STAR 40 by a line 57, an AND gate 58 and an OR gate 59 and is employed to transfer the control of the core memory 1 interrogation operation from the I STAR 26 to the A STAR 40. The AND gate 58 has a second enabling signal applied thereto from a compare latch described hereinafter. The A STAR 40 contains the core memory address of the first character in the DCF format 7. This character is read from core storage 1 through the A and B registers 25 and 23 respectively and an I/O register 60 into a file select circuit 61. The file select circuit 61 is completely described by Foulger et al. in their copending application entitled "File Selection System," assigned to the assignee of the present invention. The select circuit 61 indicates which one of the files 2 is to receive a message from or supply a message to the core memory 1.

The output of the OR gate 54 is applied to an AND gate 62 and is employed to reinsert the first character of the DCF format 7 into the same character location in core memory just interrogated. During subsequent operations, the output of the OR gate 54 is also employed to perform similar reinsertion operations. The output of the OR gate 55 is applied to the address modify circuit 38 by a line 63 indicating that the address in the A STAR 40 is to be increased by one. Additionally, the output of the OR gate 55 is applied to the control counter 49 by the line 63 and a line 64, indicating that the control counter 49 is to advance one position. Areas 8 and 9 of the DCF format 7, shown in FIG. 2, are successively interrogated from core memory 1 and are transferred to the file select circuit 61 for selecting a desired module 2 as described in the previously identified patent application.

Referring to line A of FIG. 4, the entire address transfer operation is schematically shown. The identifying numerals 0–9 shown throughout FIG. 4 correspond to the binary number generated by the control counter 49. Each time a new character position of core memory is interrogated, the control counter advances one position and applies its output signals to the decode circuit 51. The output signals from the decode circuit 51 correspond to successive characters in the DCF format 7, shown in FIG. 2, and are employed to distinguish which character of the DCF format 7 is presently being interrogated from core memory. The numerals 1$a$ through 100$a$ represent the message characters from the area 13 of the DCF format 7 involved in the data transfer operation. These numerals are generated in a message character counter described hereinafter.

Referring again to FIG. 3$a$, when the control counter 49 reaches its binary six position, the decode circuit 51 applies an output signal to an AND gate 65 by a line 66. The AND gate 65 has a second enabling signal applied thereto from the address latch 52. The output of the AND gate 65 is applied to a recycle latch 67 by an OR gate 68. The output of the OR gate 68 also resets the address latch 52 to its second stable condition wherein it ceases to generate its enabling output signal. The recycle latch 67 is set to its first stable condition wherein it applies its enabling output signal to the OR gates 54 and 56, and to an additional pair of OR gates 70 and 71. The output signal from the OR gate 54 continues to reinsert each interrogated character into the same core memory location and the output signal from the OR gate 56 continues the interrogation of the core memory 1 under the control of the A STAR 40. The output from the OR gate 70 is applied to the address modifier circuit 38 by the line 73, indicating that the core memory address just interrogated is modified by a minus one causing a recycling of the core memory 1 back through the address area 9 of the DCF format 7. The output of the OR gate 70 is also applied to the counter 49 by the line 73 and a line 74, decreasing the counter 49 one position for each character interrogated. The output of the OR gate 71 is applied to an AND gate 75 as an enabling signal, the significance of which is described hereinafter.

Referring again to FIG. 4, line B, the operation of the interrogation circuits of the core memory 1 is reversed and the interrogation operation recycles back to character position one of the address portion 9 of the DCF format 7. At this time, the control counter 49 again is in the binary decode one position and its decode circuit 51 applies its output signal to the AND gate 75 by a line 76, which gate has been previously enabled by the output signal of the OR gate 71. The output signal of the AND gate 75 sets a compare latch 78 to its first stable state wherein it applies its "ON" enabling output signal to the OR gates 54, 55 and 56.

The setting of the compare gate latch 78 indicates that the address portion 9 of the DCF format 7 is to be reinterrogated from the core memory 1. Additionally, the output from the compare latch 78 is applied to a read transducer 80 of the selected file 2 by a line 82. The read transducer transfers the permanently recorded file section address information from the file 2 to the A register 25 by the I/O register 60. The output from the OR gate 56 is applied to the A STAR 40 by the line 57, and AND gate 86 and the OR gate 59, causing the A STAR 40 to interrogate the first character in the address portion 9 of the DCF format 7. The AND gate 86 has a second input signal applied thereto from the read transducer 80 by a line 90. This second input signal comprises a sector pulse read from the file 2 by any one of a plurality of well-known methods. Each section of the file 2 is prefaced with a sector pulse and each pulse indicates that the section address follows immediately. The sector pulse is employed in the instant invention to synchronize the interrogation of the address portion 9 in the DCF format 7 from core memory 1 and the reading of the section address from the file 2 by the read transducer 80.

The first address character of the address portion 9 is transferred into the B register 23. Simultaneously, the first character of the section address is read from the file 2 by the read transducer 80 and is placed into the A register 25 through the I/O register 60. The output of the A register 25 and the B registed 23 is applied to a compare circuit 92. The compare circuit is of standard construction and generates an output signal when the two address characters are not the same. The output of the compare circuit is applied to an address compare latch 94 setting it to its second stable state wherein it generates a not equal output signal. Originally, the address compare latch 94 is set to its first stable state wherein it generates an output signal indicating that an equal condition exists. The address compare latch 94 is set to its first stable condition by the output of the latch 35 by a line 95. If the results of the first character comparison indicates a match, the condition of the compare latch remains unchanged. However, if the output of a compare circuit indicates a mismatch, the compare latch is driven to its second stable state wherein it generates an output signal indicating that the address being interrogated from core memory 1 is not the same address being read from file 2. The compare unequal output signal from the compare latch is applied to an AND gate 96 by a line 97. Successive characters in the address portion 9 of the DCF format 7 are compared with successive characters read from the address portion of the file 2.

The result of each successive compare operation is applied to the compare latch 94. At the end of an address compare operation, the recycle latch 67 is turned on by the AND gate 96, and the OR gate 68. The output of the OR gate 68 resets the compare latch 78 by an OR gate 98, resetting the latch to its second stable state wherein it generates an "OFF" or second enabling output signal for application to the AND gate 58 by a line 99. The AND gate 96 has three input signals; the first of which is the not equal output signal of the address compare latch 94, the second of which is the decode six signal on the line 66 and a line 100 from the decode circuit 51, and the third of which is the "ON" enabling output signal from the compare gate latch 78. This recycle operation is the same as the previous recycle operation and comprises utilizing the address stored in the A STAR 40 to interrogate a character from a memory location under the control of the OR gate 56, reinserting this character back into the same memory location under the control of the OR gate 54, and decreasing the contents of the control counter 49 and the address modify circuit 38 by one under the control of the OR gate 70. Referring to lines C and D of FIG. 4, it can be seen that the recycle operation also follows a compare unequal operation and reverses the interrogation process back to the first character of the address portion 9 in the DCF format 7.

When the control counter 49 is decreased to its binary one position, the decode circuit 51 applies its decode one signal to the AND gate 75 by the line 76. The AND gate 75 has a second enabling input signal applied thereto from the recycle latch 67 and the OR gate 71. The output signal of the AND gate 75 resets the recycle latch 67 and sets the compare latch 78, beginning a second compare operation. The first character stored in the core memory 1 is again transferred to the B register 23 and the first character of the section address read from the next successive message on the file 2 is transferred to the A register 25. The outputs of the A register 25 and the B register 23 are compared in the compare circuit 92 and the resultant signal is applied to the address compare latch 94. Successive interrogation cycles and reading cycles compare all characters in the address portion 9 of the DCF format 7 and the message address on the file 2. When the address compare latch 94 generates an equal compare signal, it applies the compare equal signal to a plurality of AND gates 101, 102 and 103 by a line 104 and to a write transducer 105 by a line 107.

The output signal from the latch 35 is applied to a multiple section latch 108 by the line 95, a line 110 and an OR gate 112, setting the latch to its first stable state wherein it applies its "ON" enabling output signal to an AND gate 114 and the AND gate 102 by the lines 115 and 116 respectively.

Referring to line E of FIG. 4, it can be seen that the control counter 49 and the A STAR 40 advance to character 9 of the DCF format 7. The decode circuit 51 generates an enabling output signal on its decode nine output line 118, and applies it to the AND gates 101, 102 and 103. The AND gate 102 has an additional enabling input signal applied thereto from the compare latch 78 by a line 120. The output of the AND gate 102 resets the compare latch 78 by the OR gate 98 and sets a substitute latch 122 to its first stable state wherein it generates an enabling output signal for application to the address modify circuit 38, the A STAR 40, the OR gate 54 and an AND gate 124. This enabling signal causes the A STAR 40 to interrogate the memory location corresponding to character position nine of the DCF format 7, to modify this address plus one by the modify circuit 38 and to insert the modified address into the B STAR 39 by the AND gate 124. The interrogated character is transferred to the B register 23 and reinserted into the same memory location by the AND gate 62.

The last interrogation operation has advanced the address held in the B STAR 39 to the tenth character location of the DCF format 7 while keeping the address of the A STAR 40 to the ninth character location. The significance of this operation is that the tenth character position is the first message character position. Therefore, when the B STAR 39 controls the addressing of core memory, as described hereinafter, the message is transferred to the file starting with the first message character. At the completion of this operation, the substitute latch 122 is reset by a signal from the AND gate 124, setting the latch to its second stable state, wherein it applies its second enabling output signal to the AND gate 101. The AND gate 101 has three additional input signals; the first of which is the "OFF" enabling output signal generated by the compare latch 78, the second of which is the binary decode nine signal on the line 118 from the decode circuit 51, and the third of which is applied thereto from the address compare latch 94 by the line 104. The output of the AND gate 101 is applied to an add latch 126 by an OR gate 128, setting the add latch 126 to its first stable condition, whereby it generates an enabling signal for application to the OR gates 56, 70 and 71, and a plurality of AND gates 130, 132 and 134 by lines 136, 138 and 139 respectively. The AND gate 132 has an additional enabling signal applied thereto from decode positions nine, eight, or seven from the decode circuit 51. The output of the AND gate 132 is connected to a nine inject circuit 140 by a line 142. The inject circuit 140 is connected to the A register 25 and is employed to inject a binary nine character into the A register 25 simultaneously with the reverse interrogation of each section character 12 in the area 11 of the DCF format 7. The outputs from the B register 23 and the A register 25 are applied to an adder circuit 144 wherein the contents of the B register is added to the contents of the A register. The output of the adder 144 is applied to a section decode circuit 146 and reinserted into the core memory 1 by the AND gate 130. The OR gate 70 furnishes an enabling signal to the address modify circuit 38, causing that circuit to decrease the address stored in the A STAR 40 by one, and furnishes the same enabling signal to the control counter 49 to decrease its count by one.

Referring to line F of FIG. 4, it can be seen that this reverse interrogation is repeated through the decode seven position. By the reverse interrogation of area 11 of the DCF format 7 and the adding of a numeral nine to the characters in this area, the number represented by all the section characters in the area 11 is reduced by one. The section decode circuit 146 tests the result of each adding operation to determine when the result of each adding operation is "zero." A "zero" output signal indicates that the succeeding data transfer operation is the last group of characters to be transferred in the present multiple section transfer operation. The "zero" output signal is applied to the OR gate 112 by a line 147 and the "not zero" output signal is applied to the latch 108 by a line 148, resetting the latch 108 to its second stable state, wherein it generates an "OFF" enabling output signal for application to an AND gate 150.

While the final character in the section portion 11 of the DCF format 7 is being added to the numeral nine in the adder 144, the decode position seven of the decode circuit 51 is applied as a reset pulse to the add latch 126 by a line 152 and an OR gate 154, driving the add latch 126 to its second stable state wherein it removes its enabling output signal from the OR gates 56 and 70. During the last interrogation operation, the address held in A STAR 40 is reduced one additional character position to the last character position of the address portion 9 in the DCF format 7. Additionally, the control counter was decreased to its decode 6 position. Immediately upon the resetting of the add latch 126, the OR gate 56 loses its only enabling signal. Therefore the low output of the OR gate 56 is inverted in an inverter 156 and the inverted signal is applied to the OR gate 55 and to the B STAR 39 by a pair of lines 158 and 160 respectively. This enabling signal from the B STAR 39 causes the interrogation of the core memory address location held in the B STAR 39.

Referring to line G of FIG. 4, the address held in B STAR 39 corresponds to the first character of the message area 13 in the DCF format 7. This first character is transferred through the A register 25 and the I/O register 60 to the write transducer 105 for insertion into the selected file 2. Each character written therein is counted by a message character counter 162. The character counter 162 is a standard counter operating to count successive characters in groups of one hundred. After each one-hundred group of characters, the counter 162 generates an output signal for application to the pair of AND gates 114 and 150. The B STAR 39 continues its interrogation operation of successive memory locations until a group of hundred message characters has been transferred into the file 2. The AND gate 150 is enabled and applies its output signal to the AND gate 103 and the OR gate 128 by a line 163. The output from the OR gate 128 sets the add latch 126 to its first stable state, wherein it generates an enabling output signal for application to the OR gates 56 and 70. The output of the OR gate 56 changes the control of computer interrogation from the B STAR 39 to the A STAR 40. Additionally, the output of the OR circuit 70 causes the address modifier circuit 38 to reduce the address location held in A STAR 40 by one for each address interrogation operation. The output of the add latch 126 is also applied to the AND gate 134. The AND gate 134 has a second enabling input signal from decode positions one through six of the decode circuit 51. The output of the AND gate 134 is applied to a zero inject circuit 164 by a line 166. The inject circuit 164 operates to inject the numeral zero into the A register 25 during the present decreasing of the control counter 49 through decode positions six through one. Simultaneously with the injecting of the first zero into the A register 25, the A STAR 40 interrogates core memory and transfers the last character of the address area 9 into the B register 23. The outputs of the A register 25 and B register 23 are applied to the adder circuit 144. The adder utilizes the carry digit from the preceding subtract operation to increase the last character of the address area 9 by one. The results of the addition is reinserted to the same address memory location just interrogated by the AND gate 130. The A STAR 40 recycles back through the address area 9, adding zero to each character in the address area 9 of the DCF format 7.

Therefore, by adding the numeral zero to each character in the address area 9 and by using the carry digit from the preceding addition operation, if any, the characters in the address area 9 are increased by one.

In this manner the address held in core storage is increased by one so that during the next address compare cycle, employing the next successive address of the next section of the file 2, an address compare equal signal will be generated by the compare circuit 92.

Referring to line H of FIG. 4, the entire address held in core storage has been interrogated and increased by one. Upon reaching the decode position 1, the decode circuit 51 applies its enabling output signal to the AND gate 75 and a second address compare equal operation is initiated. Additionally, the output of the AND gate 75 resets the add latch 126 by the OR gate 154 and a line 168.

Referring to line I of FIG. 4, this standard address compare cycle includes the interrogation of characters 1 through 9 of the DCF format 7. Upon reaching the character 9, the standard sector subtract operation, line J, is initiated by the AND gate 103, the OR gate 128 and the add latch 126. The AND gate 103 has a plurality of input signals all of which have been previously designated except for the enabling output signal from the latch 78 as applied thereto by the line 120 and a line 170. Upon the completion of the standard section subtract operation, the add latch 126 is reset by the decode seven signal from the decode circuit 51 over the line 152.

Referring to line K of FIG. 4, the control of the computer interrogation operation is again under the control of the B STAR 39 and an additional section of the message is written on the file 2. As previously mentioned, this transferral of the control of the memory interrogation operation to the B STAR 39 is inititated by the output of the inverter 156. Additional address add operation and section subtract operations are continued until, at the end of the final subtract operation, the sector decode circuit 146 generates an output signal on its "zero" output line indicating that the section area 11 of the DCF format 7 has been reduced to zero and applies the "zero" signal to the OR gate 112. The output signal of the OR gate 112 sets the latch 108 to its first stable state wherein it generates an enabling output signal for application to the AND gate 114. The AND gate 114 has a second input signal from the character counter 162. The output of the AND gate 114 is applied to the I STAR 26 by a line 172 indicating that at the termination of the present interrogation operation, signified by the output signal from the counter 162, the computer is to advance to the next operation code 4.

The increased operating speed of the computer is employed during substitute operations, section subtract operations and address add operations to complete these operations prior to the reception of the next signal from the file 2.

While the invention has been particularly shown and described with reference to a preferred embodiment thereof, it will be understood by those skilled in the art that various changes in form and details may be made therein without departing from the spirit and scope of the invention.

What is claimed is:

1. In a record transfer system for transferring a single message into a plurality of individually addressable file sections, a multiple section transfer system comprising,
   means for storing a disk control field and said field comprises a plurality of groups of characters constituting the message and section address indicia for identifying that file section into which the initial character group is to be transferred and section count indicia for indicating the total number of file sections that are to receive message characters,
   means for utilizing said stored section address to designate the file section into which said initial group is to be written, means for writing said initial group into said designated section,
   means for modifying said stored section address to designate the next file section which is to receive data,
   said utilizing means including means for reading section addresses from the file,
   means for comparing said modified section address with said address of said next file section read from the file,
   said writing means being employed for writing said next successive group in the next file section to be addressed,
   means for modifying said section count as each successive group of characters is written into each different designated file section, and
   means for transferring control to said first modifying means until all message file groups are written into respective corresponding file sections.

2. In a record transfer system for transferring a single message into a plurality of individually addressable file sections, a multiple section transfer system comprising,
   means for storing a disk control field and said field comprises a plurality of groups of characters constituting the message and section address indicia for identifying that file section into which the initial character group is to be transferred and section count indicia for indicating the total number of file sections that are to receive message characters,
   means for utilizing said stored section address to designate the file section into which said initial group is to be written,
   means for modifying said section count to denote the reduced number of file sections still to receive message characters,
   means for writing said initial group into said designated section,
   means for modifying said stored section address to designate the next file section which is to receive data,
   said utilizing means including means for reading section addresses from the file,
   means for comparing said modified section address with said address of said next file section read from the file, and
   means for transferring control to said section count modifying means until all message character groups are written into respective corresponding file sections.

3. In a record transfer system for transferring a single message into a plurality of individually addressable file sections, a multiple section transfer system comprising,
   means for storing a disk control field and said field comprises a plurality of groups of characters constituting the message and section address indicia for identifying that file section into which the initial character group is to be transferred and section count indicia for indicating the total number of file sections that are to receive message characters,
   means for utilizing said stored section address to designate the file section into which said initial group is to be written,
   means for modifying said section count by a predetermined number of sections to denote the reduced number of file sections still to receive message characters,
   means for writing said initial group into said designated section,
   means for modifying said stored section address by a predetermined number to designate the next file section which is to receive data,
   said utilizing means including means for reading section addresses from the file, means for comparing said modified section address with said address of said next file section read from the file, said section count modifying means being employed for modifying said section count by the same predetermined number of sections to denote the reduced number of file sections still to receive groups of characters, said writing means being employed for writing the next successive group in the next file section to be addressed, and means for transferring control to said section address modifying means until all message groups are written into respective corresponding file sections.

4. In a record transfer system for transferring a single message into a plurality of individually addressable file sections, a multiple section transfer system comprising, means for storing a disk control field and said field comprises a plurality of groups of characters constituting the message and section address indicia for identifying that file section into which the initial character group is to be transferred and section count indicia for indicating the total number of file sections that are to receive message characters, means for utilizing said stored section address to designate the file section into which said initial group is to be written, means for modifying said section count by one to denote the reduced number of file sections still to receive groups of characters, means for writing said initial group into the designated section, means for modifying said stored section address by one to designate the next file section which is to receive data, said utilizing means including means for reading section addresses from the file, means for comparing said modified section address with said address of said next file section read from the file, said section count modifying means being employed for modifying said section count by one to denote the reduced number of file sections still to receive groups of characters, said writing means being employed for writing the next successive group in the next file section to be addressed, and means for transferring control to said section address modifying means until all message groups are written into respective corresponding file sections.

5. In a record transfer system for transferring a single message into a plurality of individually addressable file sections, a multiple section transfer system comprising, means for storing a disk control field and said field comprises a plurality of groups of characters constituting the message and section address indicia for identifying that file section into which the initial character group is to be transferred and section count indicia for indicating the total number of file sections that are to receive message characters, means for reading said file section address from the file, means for comparing said stored section address with said file section address read from the file, means for testing said results of said comparison for conformity between the compared addresses, means for transferring control to said reading means until said testing shows conformity between the compared addresses, means for writing said initial group into said addressed section, means for modifying said stored section address to designate the next file section which is to receive data, said reading means being employed for reading said next successive file section address from the file, said comparing means being employed for comparing said modified section address with said next successive file section address, said testing means being employed for testing the results of said last mentioned comparison for conformity between the compared addresses, said transfer control means being employed for transferring control to said reading means until said last mentioned testing shows conformity between the compared addresses, means for modifying said section count as each successive one of said group of characters is written into each different designated file section, said writing means being employed for writing said next successive group in said next file section to be addressed, and means for transferring control to said section address modifying means until all message character groups are writen intto respective corresponding file sections.

6. In a record transfer system for transferring a single message into a plurality of individually addressable file sections, a multiple section transfer system comprising, first storage means having a plurality of individually addressable storage locations for storing a disk control field and said field comprises a plurality of groups of characters constituting the message and section address indicia for identifying that file section into which the initial character group is to be transferred and section count indicia for indicating the total number of file sections that are to receive message characters, each of said characters being stored in one of said individually addressable storage locations, means for reading said file section address from the file, means for comparing said stored section address with said file section address read from the file, means for testing said results of said comparison for conformity between the compared addresses, means for transferring control to said reading means until said testing shows conformity between the compared addresses, means for generating said address of said first character of said initial group of characters in said first storage means, second storage means for storing said generated address, means for modifying said section count to denote the reduced number of file sections still to receive message characters, means responsive to said address in said second storage means for interrogating said initial group of characters from said first storage means and for writing said initial group into said file section designated by said section address indicia, said generating means being employed for generating said first storage means address of the beginning of said next successive group of characters, means for modifying said stored section address in said first storage means to designate the next file section to receive said next successive group of characters, said reading means being employed for reading said next successive file section address from the file, said comparing means being employed for comparing said modified section address with that of the next successive file section address read from the file, said testing means being employed for testing said results of said last mentioned comparison for conformity between the compared addresses, means for transferring control to said reading means until the testing shows conformity between the compared addresses, said section count modifying means being employed for further modifying said section count to denote the reduced number of file sections still to receive groups of characters, said interrogating and writing means being responsive to said address in said second storage means for interrogating and writing said next successive groups of characters into the next addressed file section, and means for transferring control to said generating means until all message character groups are written into respective corresponding sections.

7. In a record transfer system for transferring a single message from a computer into a plurality of separately addressable file sections in a random access file, a multiple section transfer system comprising, first storage means having a plurality of individually addressable storage locations for storing a disk control field and said field comprising a plurality of groups of characters constituting the message and section address indicia for identifying that file section into which the initial character group is to be transferred and section count indicia for indicating the total number of file sections that are to receive the message characters, each of said characters being stored in one of said individually addressable storage locations, means for interrogating said stored section address corresponding to the initial file section to receive the initial group of characters, means for reading the section address from the file, means for comparing said interrogated section address with the address read from the file, means for testing said results of said comparison for conformity between the compared addresses, means for recycling said interrogation of the stored section address back to the beginning of said stored section address when said testing shows nonconformity between the compared addresses, means for transferring control to said interrogating means until said testing shows conformity between the compared addresses, means for generating said first character address in said first storage means of the beginning of the initial group of characters to be transferred to the designated file section, second storage means for storing said generated address, means for reducing said section count by one to denote the reduced number of file sections still to receive message characters, means responsive to said address in said second storage means for interrogating said initial group of characters from said first storage means and for writing said initial group into said file section designation by said section address indicia, said generating means being employed for generating said first storage means address of the beginning of said next successive group of characters, means for increasing said stored section address by one to designate the next successive file section to receive the next successive group of characters, said reading means being employed for reading the next successive file address, said interrogating means being employed for interrogating said stored section address corresponding to the next successive file section to receive the next successive group of characters, said comparing means being employed for comparing said increased section address with the next successive file address, said testing means being employed for testing the results of said last mentioned comparison for conformity between the compared addresses, said reducing means being employed for further reducing said stored section count by one to denote the reduced number of file sections still to receive message characters, said interrogating and writing means being responsive to said increased address in said second storage means for interrogating and writing said next successive character group to write this group to the address section, and means for transferring control to said generating means until all message character groups are written into respective corresponding sections.

8. In a data processing system employing a computer responsive to predetermined operation codes for transferring data records between the computer and a plurality of individually addressable storage sections in a file module, a multiple section transfer circuit comprising, a storage circuit, a plurality of operation codes stored in said storage circuit, a plurality of groups of characters constituting one of the records stored in said storage circuit, a plurality of address characters stored in said storage circuit for designating the file module section into which the initial character group is to be transferred, a plurality of section characters stored in said storage circuit for indicating an additional plurality of file module sections that are to receive message characters, means responsive to said operation codes for selectively interrogating said stored characters, means for reading section addresses from the file, means responsive to said stored address characters and said section address read from the file to locate said designated file section, means for transferring the initial character group to said designated file section, means for modifying the section characters as each successive one of said groups of characters is written into each different designated file section, means for modifying the stored section address to designate the next file section into which the next character group is to be transferred, and means for determining the end of each message to be transferred.

References Cited

UNITED STATES PATENTS

| | | | |
|---|---|---|---|
| 2,968,027 | 1/1961 | McDonnell et al. | 340—172.5 |
| 3,111,648 | 11/1963 | Marsh et al. | 340—172.5 |
| 3,163,850 | 12/1964 | Austin et al. | 340—172.5 |
| 3,289,175 | 11/1966 | Rice | 340—172.5 |

PAUL J. HENON, *Acting Primary Examiner.*